(12) United States Patent
Spoor

(10) Patent No.: X8574
(45) Date of Patent: Jan. 7, 1835

(54) STOVES, ANTHRACITE COAL (RE-ISSUE)

(76) Inventor: Abraham D. Spoor

Abraham D. Spoor

The Schedule referred to in these Letters Patent and making part of the same containing a description in the Words of the said Abraham D. Spoor himself of his Improvement in "Stoves for burning Anthracite and other Coal" for which Letters Patent were granted dated the 15 th day of March 1834 which Letters Patent being hereby cancelled on account of a defective specification

---

. To all whom it may concern - Be it known that I. Abraham D. Spoor of the Town of Coxackie, County of Greene and State of New York, have invented certain Improvements in Stoves for burning Anthracite and other Coal, and that the following is a full and exact description of the construction and operation of the said Stove, reference being had to the drawings which accompany and make a part of this Specification. The form in which I usualy make this Stove is that of a square box or right prism, as shown in the drawing No 2. The front has two openings, one for the ash drawer seen at a - the other for the introduction of fuel seen at b, the ash drawer occupies about two thirds of the width of the Stove, the remaining width being occupied by two flues, one on each side of the ash drawer to be presently described. The upper opening may correspond in width with the ash drawer or it may be of any other dimensions which may be prefered, its lower edge is just above the upper part of the furnace or receptacle for fuel, this opening is closed by a door, consisting in general of a metalic open-work frame filled in with laminated Mica, as the whole of this door is above the fuel its ignited surface is consequently exposed to full view, the top and bottom plates of this Stove are made flat and the opening for the pipe by which the smoke is conducted off may be either in the top or back plates; within the body of the Stove there are two other plates placed horizontally, one of these called the bed plate is represented at No 1. This as it contains the circular grate is placed immediately over the ash drawer, and sustains the brick or lining of the furnace, It fits closely against the plates which form the exterior of the Stove and against the flues which pass up and down at its corners for which purpose it is notched out at a, a, a, a, It has also a circular opening in the middle sufficiently large to allow of the tilting of the grate B. which is sustained over it. This grate is made capable of vibrating or rotating on its centre to discharge the ashes deposited upon it and it may also be tilted, to discharge the coals. The manner in which these operations are effected I will now describe, There is a part d which is sunk about an inch below the general level of the bed plate and into this the separate piece e fits closely there being a notch or slot in one of the outer plates of the Stove (generally the back plate) corresponding to this depression and in connection with it making an avenue from the outside of the Stove to the grate, and this opening in the out side plate is closed by a shutter that exactly fits it.

The grate is made flat, or nearly so, the bars may be from three quarters of an inch to an inch in width about a quarter of an inch in thickness and the same distance apart, There are a number of small protuberances or projecting points on the upper surface of the grate, as at f. f. f. f. for the purpose of jostling or shaking the coal, to discharge the ashes when the grate is vibrated or rotated; and in order to do this, the shutter is removed from the entrance of the avenue, and an iron which I call a shaker or rotator, is introduced between the two projecting pieces h, h, which proceed from the lower surface to the rim of the grate; or, instead of these there may be an opening in the rim of the grate to receive the end of the shaker, moving the shaker both ways in quick succession as far as the opening will admit will effectually detach and remove the ashes from the Coal The grate is supported in part by a bar which crosses the opening nearly under its centre, - this bar is shown seperately at K, and its ends are seen resting on the plate No 1 at c.c.:- there is a notch made in the bed plate at b - and when the grate is turned upon its centre pin so as to bring the projecting piece g, over the opening b, the grate will tilt, in consequence of the bar being behind the centre of gravity; there may be other modes adopted for suspending and rotating the grate, but as these would be mere variations of the same principle, and as I am not aware of any which should be prefered, it is not deemed necessary that I should point them out.

The furnace of this Stove I make circular, forming it by a lining of fire brick or other suitable non-conductor of heat. This lining, as before observed, rests upon the bed-plate and is to rise above it, to the height of eight or nine inches only whatever may be the diameter of the furnace, or the size of the stove; the coal being found to burn better and the ashes being more readily discharged when the column feet
does not exceed this height. The second horizontal plate
in the interior of the stove rests upon this lining being
notched out at the corners, like the bed-plate, and
having a circular opening in its middle, of the same
diameter with the furnace. this plate is designed mere-
ly to give a good and firm finish to the upper part of
the furnace, and may, if prefered, be dispenced with; Besides
these plates I place another which passes diagonally from
the back to the top plate, behind and over the fire. This
plate is seen at m, in No 3. which represents a part
of the interior of the stove - when one of the side plates
is removed, n, being the front & o. the back plate, The
particular use of this diagonal plate will presently ap-
pear, A very important part of my improvement
consists in what I denominate the reverberating or restor-
ing flues, which I will now describe, The ash-drawer
I have said occupies about two thirds of the width of
the stove, & there is consequently a space between each
of its sides, and the side plates of the stove, These spaces by
means of partitions on each side of the ash-drawer reach-
ing from the front to the back plate, are made to form
a part of the said reverberating flues - their width
being equal to that of the notches a, a, in the bed-
plate which rests upon the partitions, when the bed-
plate has been put into its place, angular pieces adapted
to the notches at its corners, are placed thereon, form-
ing with the out side plates of the stove vertical flues
at each corner, No 3. by the removal of the side plate,
exhibit the location and operation of these flues - the
front flue p. terminates at some distance above
the furnace - but does not reach the top plate. The back
flue q. extends to the diagonal plate, and opens into
the the smoke chamber z, from which proceeds the smoke pipe a. it is now evident that the draft will be in the direction indicated by the arrows and that the lower part of the stove will become heated by the passage of the heated air from the fuel in contact with it; and what has hereto been a desideratum, the diffusion of heat from the lower part of a stove lined with non-conducting material, is fully attained, whilst it is also economized by its distribution from flues within the interior of the stove, instead of from smoke pipes exterior to it, as has heretofore been done, as there would be some inconvenience in carrying the draft through the reverberating flues during the time of igniting the fire, I make an opening in the diagonal plate m, No 3, through which the smoke may pass directly from the fire, which opening is furnished with a valve or shutter t, which may be closed as soon as the fire is properly lighted - a handle for this purpose may pass out through one of the side plates as at c, No 2.

In the foregoing description, I have made known the manner in which I construct my stove, and in so doing, have necessarily included many things, of which I do not claim to be the inventor, I therefore now proceed to state specifically in what my improvements consist, and they are as follows.

I claim the use of a flat rotary grate having protuberances on its upper surface, for jostling the coal and thereby seperating the ashes, with the general arrangement and construction of the respective parts for sustaining, tilting or rotating the same through an avenue in which the shaker is inserted as above described. I claim the internal reverbe-

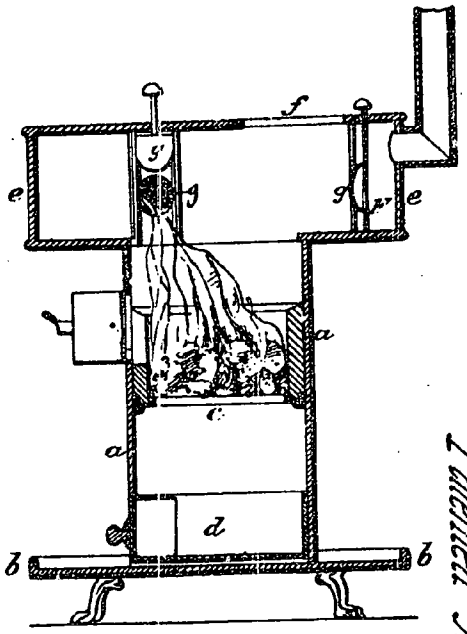
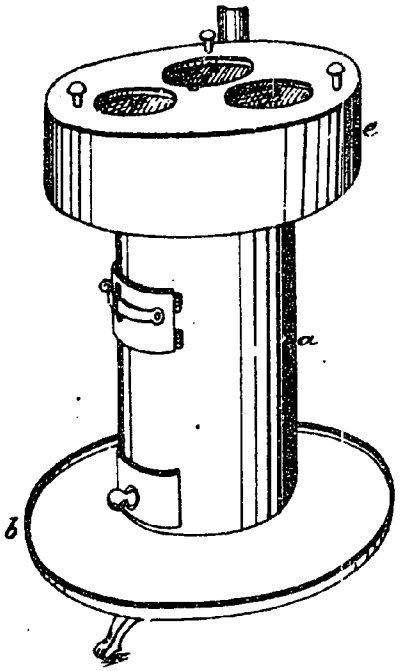

United States Patent
Patent No.: X8574
NO PRINTED SPECIFICATIONS AVAILABLE
A. D. Stoor,
Cook Stove.
Patented Jan. 7. 1835.